US008873829B1

(12) United States Patent
Tyra et al.

(10) Patent No.: US 8,873,829 B1
(45) Date of Patent: Oct. 28, 2014

(54) METHOD AND SYSTEM FOR CAPTURING AND UTILIZING ITEM ATTRIBUTES

(75) Inventors: Andrew Sean Tyra, Seattle, WA (US); Ian D. Clarkson, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 1218 days.

(21) Appl. No.: 12/239,503

(22) Filed: Sep. 26, 2008

(51) Int. Cl.
G06K 9/00 (2006.01)

(52) U.S. Cl.
USPC ............................................ 382/140; 382/181

(58) Field of Classification Search
CPC .............. G06K 9/344; G06K 9/00442; G06K 9/00456; G06K 9/00463
USPC .......................................... 382/173–231, 140
See application file for complete search history.

(56) References Cited

U.S. PATENT DOCUMENTS

| 5,880,451 A | 3/1999 | Smith et al. | |
| 6,744,938 B1* | 6/2004 | Rantze et al. | 382/312 |
| 6,796,507 B2 | 9/2004 | Bean et al. | |
| 2004/0181467 A1* | 9/2004 | Raiyani et al. | 705/28 |
| 2005/0289182 A1* | 12/2005 | Pandian et al. | 707/104.1 |
| 2008/0179398 A1* | 7/2008 | Skaaksrud et al. | 235/384 |
| 2008/0279481 A1* | 11/2008 | Ando | 382/306 |

* cited by examiner

Primary Examiner — Amir Alavi
Assistant Examiner — Kenny Cese
(74) Attorney, Agent, or Firm — Robert C. Kowert; Meyertons, Hood, Kivlin, Kowert & Goetzel, P.C.

(57) ABSTRACT

Various embodiments of a method and system for capturing and utilizing item attributes are described. Various embodiments may include a mobile image capture apparatus, which may include a computer system configured to execute an image capture application. The image capture application may instruct an agent to capture an image of an item label. A data extraction component may be configured to process the images captured by the mobile image capture apparatus. For a given captured image, the data extraction component may in various embodiments be configured to perform OCR to determine one or more strings of characters from the image. The data extraction component may be further configured to determine whether one or more patterns match a determined string of characters. In response to the detection of a particular pattern matching a particular string of characters, the data extraction component may extract and store an attribute of the corresponding item.

18 Claims, 18 Drawing Sheets

530

Salix's Pork & Beef chews are 2 chews in 1. Our unique and patent pending chews allow for your pet to fully enjoy two of the flavors that dogs love most, Pork & Beef. We use the highest quality pork and premium beef hides and then roll them together in a way that helps maximize the flavor and chewing satisfaction throughout the life of the chew. It is truly 2 chews in 1!

540

SCOTTISH FUDGE
WITH VANILLA

Painstakingly blended in
original copper kettles, subtly
flavoured and cooled on traditional
Maplewood tables.

Fudge, smooth and creamy
Tablet, brittle to the bite and melt
in your mouth. Both perfect Our fudge and tablet is handmade
in the Highlands of Scotland
using traditional methods and
quality ingredients.

*Figure 5B*

*Packed in a facility that also processes wheat, dairy, pine nuts, soy.*

Figure 5D

Sprinkle on grilled fish before serving. Add to taste to mayonnaise and milk or cream for a delicious sauce.

Figure 5E

```
Nutrient | Calories | 210 | |
Nutrient | Calories from fat | 140 | |
Nutrient | Calories from saturated fat | | |
Nutrient | Total fat | 15g | 23 |
Nutrient | Saturated fat | 8g | 38 |
Nutrient | Polyunsaturated fat | | |
Nutrient | Monounsaturated fat | | |
Nutrient | Trans fat | 0g | |
Nutrient | Cholesterol | 0mg | 0 |
Nutrient | Sodium | 0mg | 0 |
Nutrient | Potassium | | |
Nutrient | Total carbohydrate | 22g | 7 |
Nutrient | Dietary fiber | 5g | 22 |
Nutrient | Soluble fiber | | |
Nutrient | Insoluble fiber | | |
Nutrient | Sugars | 16g | |
Nutrient | Sugar alcohol | | |
Nutrient | Other carbohydrate | | |
Nutrient | Protein | 3g | |
Nutrient | Vitamin A | | 0 |
Nutrient | Percent of vitamin A present as beta-carotene | | |
Nutrient | Vitamin C | | 0 |
Nutrient | Calcium | | 4 |
Nutrient | Iron | | 30 |
``` structured information (machine readable)

↑ pattern recognition

```
Nutrition Facts Serving Size 10
sections (42g) Servings Per Container
about 2.5 Amount Per Serving
Calories 210 Calories from Fat 140
Daily Value' Total Fat 15g 23°ÿÿ -- --
Saturated Fat 8g 38°,6 Trans Fat 0g
Cholesterol 0mg 0°,U --
Sodium 0mg 0°,6 Total Carbohydrate
22g 7°k Dietary Fiber 5g 22°ÿÿ Sugars
16g --- Protein 3g Vitamin A 0°,6
Vitamin C 0°ÿÿ Calcium 4°,6 Iron 30°,6
'Percent Daily Values are based on a
2.000 calorie diet.
``` character string(s) (machine readable)

*Figure 11B*

Nutrition Facts

Serving size: 10 sections (42g)

Servings Per Container: about 2.5

| | Amount Per Serving | |
|---|---|---|
| | Base | ± |
| Calories | 210 | ( %) |
|   Calories from fat | 140 | ( %) |
|   Calories from saturated fat | | ( %) |
| Total fat | 15g | (23 %) |
|   Saturated fat | 9g | (38 %) |
|   Polyunsaturated fat | | ( %) |
|   Monounsaturated fat | | ( %) |
|   Trans fat | 0g | ( %) |
| Cholesterol | 0mg | (0 %) |
| Sodium | 0mg | (0 %) |
| Potassium | | ( %) |
| Total carbohydrate | 22g | (7 %) |
|   Dietary fiber | 5g | (22 %) |
|   Soluble fiber | | ( %) |
|   Insoluble fiber | | ( %) |
|   Sugars | 16g | ( %) |
|   Sugar alcohol | | ( %) |
|   Other carbohydrate | | ( %) |
| Protein | 3g | ( %) |
|   Vitamin A | | (0 %) |
|   Percent of vitamin A present as beta-carotene | | ( %) |
|   Vitamin C | | (0 %) |
|   Calcium | | (4 %) |
|   Iron | | (30 %) |
|   Riboflavin | 2g | (10 %) |

±
*Percent Daily Values are based on a 2,000 calorie diet. Your daily values may be higher or lower based on your calorie needs.

product detail information

Figure 11C

METHOD AND SYSTEM FOR CAPTURING AND UTILIZING ITEM ATTRIBUTES

BACKGROUND

In a distribution system, a merchant or other product distributor (which may collectively be referred to as distributors) typically maintains an inventory of various items at one or more distribution centers, fulfillment centers, cross-docking facilities, materials handling facilities or warehouses (which may collectively be referred to herein as a materials handling facility). The inventory items are ordered from one or more vendors, received at the materials handling facilities as inbound shipments, and stocked in inventory of the materials handling facilities. In an order fulfillment process, orders for items may be received from customers of the merchant. Units of the ordered items are picked from various locations in the inventory in the materials handling facilities, processed for shipping, and shipped as outbound shipments to the customers.

In many cases, the orders fulfilled by a materials handling facility are placed remotely. For instance, in many cases such orders may be orders submitted via a merchant's website. In these cases, customers may not have the luxury of examining an item in-person. Such in-person examination may in many cases provide a customer with information relevant to the product being considered for purchase; knowledge of this information may make many customers feel more comfortable about purchasing such products remotely. For instance, a food product's label might include relevant information such as a list of ingredients or nutritional information. In another example, the label of an over-the-counter medication might specify directions for use or other information, such as warnings specifying a list of other medications that should not be administered in conjunction with the particular medication. Some merchants may have product catalogues that include vast quantities of different items for sale. Typically, many of such items are provided by disparate vendors. Items supplied by many vendors may not be accompanied by electronic data specifying the information present on the labels of the items.

BRIEF DESCRIPTION OF THE DRAWINGS

FIGS. 5A-5E illustrate example images of item labels that may be captured by a mobile image capture apparatus, according to some embodiments.

FIGS. 11A-11C illustrate a process for extracting attributes of items from captured images of items, according to some embodiments.

Figure 1:
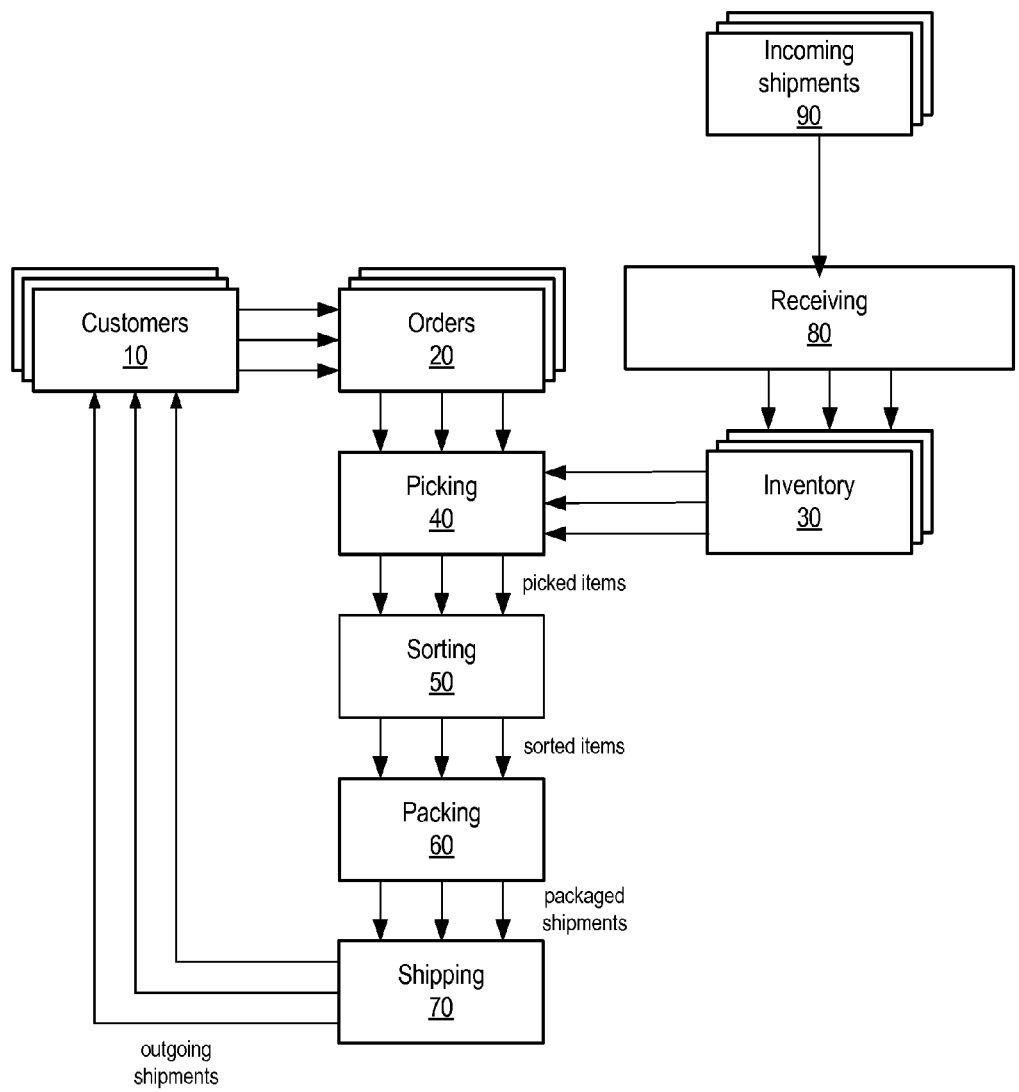
FIG. 1 illustrates a logical representation or view of the operation of a materials handling facility in which embodiments of the method and system for capturing and utilizing item attributes may be implemented, according to some embodiments.

While various embodiments are described herein by way of example for several embodiments and illustrative drawings, those skilled in the art will recognize that various embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope of various embodiments as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a method and system for capturing and utilizing item attributes are described. Various embodiments may include a mobile image capture apparatus. The mobile image capture apparatus may include a computer system or other device configured to execute an image capture application. The image capture application may be configured to instruct an agent to move the mobile image capture apparatus to a specific location within a materials handling facility for capturing images of various items. One example of such location includes a particular bin of a pick module (describe in more detail below). Such bins may include items, such as items stored in inventory. In many cases such items may include information pertaining to the item. This information may be specified by various portions of the item including but not limited to a label of the item, packaging of the item, and one or more tags affixed to the item. Such locations specifying information pertaining to the item may be referred to herein as an "item label" or simply a "label." Labels may convey various types of information pertaining to an item including but not limited to nutrition facts, ingredients, directions, indications, warnings, drug interactions and other information pertaining to the item.

The image capture application may be configured to instruct an agent to utilize an image capture device of the mobile image capture apparatus to capture an image of an item label. Note that in various embodiments capturing an image of an item label may but does not need to include capturing an image of an entire label. In some cases, capturing an image of an item label may include capturing only a portion of the item label. Examples of such an image capture device may include any of various photosensitive apparatuses including but not limited to cameras (digital or analog), image scanners (e.g., a flatbed scanner), and various other types of photosensitive devices, such as devices equipped with charge-coupled devices (CCDs), contact image sensors (CISs), photomultipliers, or some variant or substitute thereof. In general, the image capture device may utilize any technology to capture information (e.g., in the form of one or more images) from an item, whether such technologies are presently known or developed in the future. The image capture application may be configured to transmit the captured images to a data extraction component configured to extract information from such images as described in more detail below. While in some embodiments the data extraction component may be a component of another computer system (e.g., a central server), in various other embodiments the functionality of the data extraction component may be implemented as part of the mobile image capture apparatus.

The data extraction component may be configured to process the images captured by the mobile image capture apparatus described above. Note that the mobile image capture apparatus need not be limited to processing images captured by the mobile image capture apparatus; in various embodiments the data extraction component may be configured to process images from other components or systems. For a given captured image, the data extraction component may in various embodiments be configured to perform optical character recognition (OCR) to determine one or more strings of characters from the image. In various embodiments, a given string may include multiple characters, symbols, and/or numbers. In some cases, one or more of said strings may include only one of such characters, symbols, or numbers. Note that various embodiments are not limited to OCR and that other techniques for extracting machine-readable text from images of printed, type- or hand-written text may be utilized, whether such techniques are presently known or developed in the future.

The data extraction component may be further configured to determine whether one or more patterns (e.g., regular expressions) match one or more of the determined strings of characters. In some cases, a particular set of one or more patterns may be chosen based on a determination of the type of information specified by the image from which the character strings were determined. For instance, if it is determined that such image represents nutrition facts, the data extraction component may be configured to utilize a particular set of patterns designated for the detection of nutrition facts. Similarly, if it is determined that such image represents ingredients, the data extraction component may be configured to utilize a particular set of patterns designated for the detection of ingredients. As described in more detail herein, other types of pattern may be utilized to detect other types of information.

In response to the detection of a particular pattern matching a particular string of characters, the data extraction component may extract information from the particular string and store such information as an attribute of the corresponding item. For instance, the data extraction component may extract the value "16" from the particular string and store this as an attribute that represents the quantity of grams of fat per serving of the corresponding item (e.g., a food product). In various embodiments, by virtue of determining that the particular pattern matched the string of characters, the data extraction component may be configured to determine that the value "16" is to be stored as an attribute representing the quantity of grams of fat per serving of the corresponding item. More specifically, particular patterns may in various embodiments be associated with particular attributes and thus the data extraction component may leverage such association to store extracted information in a structured format. This process is described in more detail below.

In various embodiments, the extracted attributes may be stored as attributes of a particular object, such as an object representing the corresponding item (e.g., the item from which the images were originally captured). For example, a given object may have one or more associated key-value pairs that each specify an attribute and a value for the attribute. For instance, one attribute might be <fat per serving expressed in grams> and the value for such attribute might be <16> as is the case in the aforementioned example. The data extraction component may in various embodiments compile (i.e., collect or store) the various attributes in one or more databases structured according to a variety of database models including but not limited to the hierarchical database model, network database model, relational database model, object/relational database model, object-oriented database model, the semistructured database model, the associative database model, the entity-attribute-value (EAV) database model, the context database model, or another type of database model, whether such model is presently known or developed in the future.

Various embodiments may utilize the structured information (e.g., item attributes, such as nutrition facts, ingredients, directions, warnings, etc.) to provide a content-rich shopping experience for users of an network-based marketplace, such as an electronic commerce ("e-commerce") portal. For instance, the merchant controlling the materials handling facility described herein may in various embodiments sell ones of items stored in the materials handling facility through an e-commerce portal. Such e-commerce portal may be implemented via one or more server computer systems configured to provide product detail pages (e.g., web pages) to client computer systems operated by various customers as well as components for ordering items listed on such product detail pages (e.g., a network-based shopping cart or a similar commerce application). In various embodiments, a data publishing component may be configured to publish item attributes captured as described above to corresponding product listing pages (e.g., network based content, such as web pages). For instance, when a customer views a particular product detail page, a listing of captured item attributes may be displayed as part of the product detail page. In other cases, the product detail page may provide a network address (e.g., a hyperlink) to a page that specifies such attributes for the corresponding item. In some embodiments, the data publishing component may respond to requests or queries for data (e.g., a request for one or more attributes of a specific item), which in turn may be utilized to populate content of a corresponding product detail page.

In various embodiments, an attribute-based search component may also be configured to provide attribute-based search functionality to various systems (e.g., a web server providing product detail pages for an e-commerce portal) and/or directly to clients (e.g., customer of an e-commerce portal). For instance, the attribute-based search component may respond to attribute-related queries from client computer systems (i.e., computer systems under the control of customers). For example, a customer may submit a search request for all cookies containing less than 100 calories per serving; the attribute-based component may respond to such request by providing a list of one or more items meeting the search criteria. Other examples of a search request that may be serviced by the attribute-based search component may include a search for products that do not have child safety warnings or a search request for medication that does note have drowsiness listed as a side effect. Other search capabilities provided by the attribute based search component are described in more detail below.

Note that various components of the method and system for capturing and utilizing item attributes may in some cases be described as separate components (e.g., the mobile image capture apparatus, the image capture application, the image capture device, the data extraction component, the data publishing component, and the attribute-based search component described herein). Nevertheless, it should be understood that any of the functionalities described herein may be incorporated in fewer or more components according to various embodiments.

FIG. 1 illustrates a logical representation or view of the operation of a materials handling facility in which various embodiments may be implemented. For example, this Figure may illustrate a materials handling facility of a product distributor, merchant, or e-commerce enterprise. Multiple customers 10 may submit orders 20 to the product distributor, where each order 20 specifies one or more items from inventory 30 to be shipped to the customer that submitted the order. To fulfill the customer orders 20, the one or more items specified in each order may be retrieved, or picked, from inventory 30 (which may also be referred to as stock storage) in the materials handling facility, as indicated at 40. Picked items may be delivered or conveyed, if necessary, to one or more stations in the materials handling facility for sorting 50 into their respective orders, packing 60, and finally shipping 70 to the customers 10. In various embodiments, picked items may be delivered to an induction station, where the items are inducted into a sorting system (e.g., a sorting mechanism, sorting process, or some combination thereof). The items may then be routed to particular destinations in accordance with the requests (orders) currently being processed, e.g. to sorting stations, under direction of the control system. Various sorting mechanisms and processes (which may be represented by sorting 50) are described in more detail below. A picked, packed and shipped order does not necessarily include all of the items ordered by the customer; an outgoing shipment to a customer may include only a subset of the ordered items available to ship at one time from one inventory-storing location. In other cases, items of the order may be split into multiple shipments for a variety of reasons including but not limited to space and/or economic efficiency. For instance, shipping a set of items in three small shipments may be less expensive than shipping the set of items in one large shipment.

A materials handling facility may also include a receiving 80 operation for receiving shipments of stock from one or more sources (e.g., vendors) and for placing the received stock into stock storage. The receiving 80 operation may also receive and process returned purchased or rented items or orders from customers. At least some of these items are typically returned to inventory 30. The various operations of a materials handling facility may be located in one building or facility, or alternatively may be spread or subdivided across two or more buildings or facilities.

Figure 2:
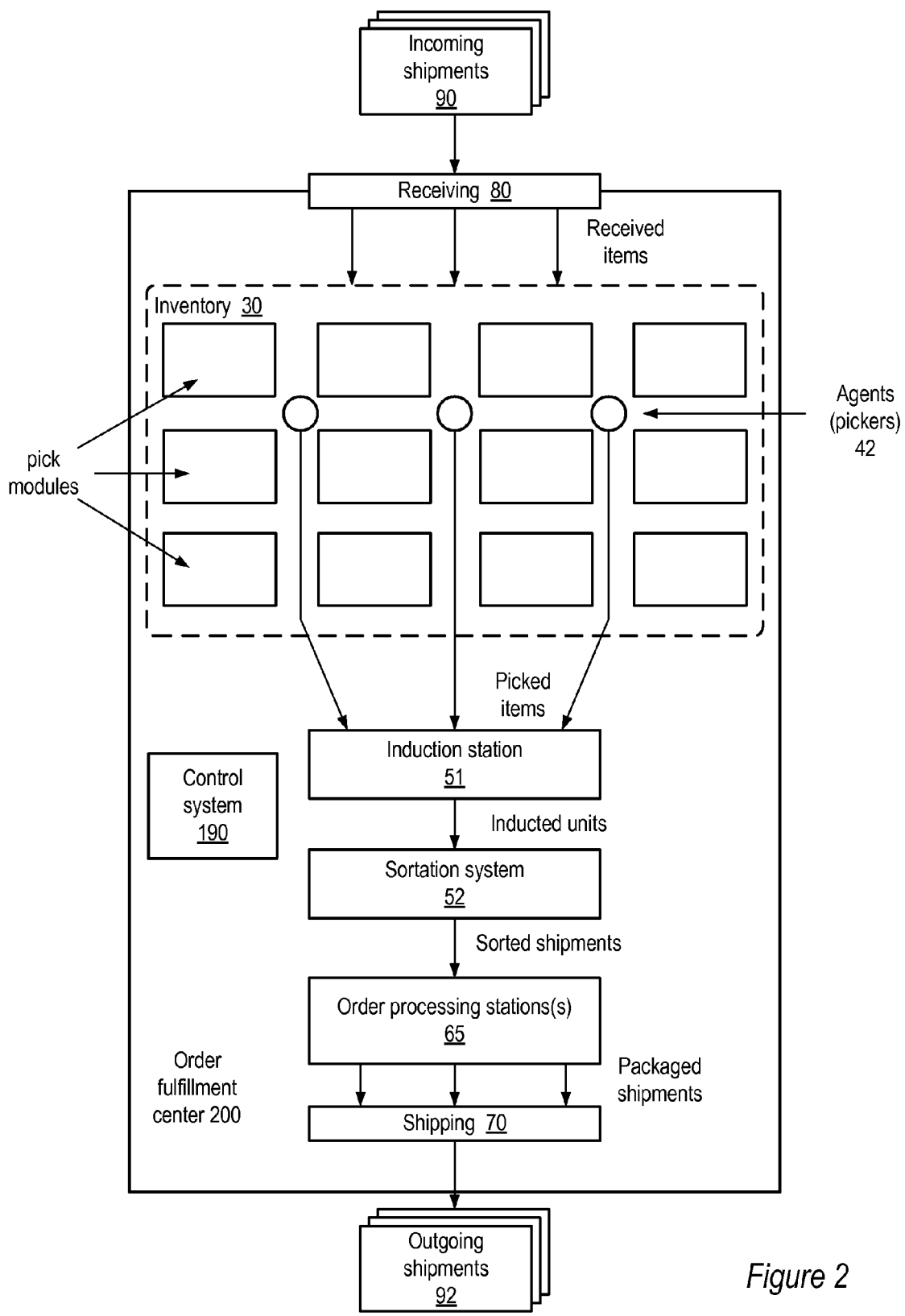
FIG. 2 illustrates one embodiment of the physical layout of a materials handling facility, according to some embodiments.

FIG. 2 illustrates an example of a physical layout of a materials handling facility, such as an order fulfillment facility or center, in which various embodiments may be implemented. At any one time, one or more agents 42 of the distributor may each be picking items from inventory 30 to fulfill portions or all of one or more requests or orders. This may result in multiple items (e.g., a stream of items and/or batches of picked items) for multiple incomplete or complete orders, which may then be delivered to an induction station 51 for sortation system 52, which may include sorting mechanisms and/or sorting processes for sorting items into respective shipments of items. For example, in some embodiments, the induction point may refer to a station where items may be inducted into a conveyance mechanism for conveying items to sorting stations configured for sorting items into respective shipments.

In some embodiments, the conveyance mechanism (under direction of the control system) may then deliver the items to various order processing stations 65, which may include one or more packing stations, in the materials handling facility for processing prior to shipping 70. Portions of an order may be received from the pickers 42, or from other stations, at a processing station 65 at different times, so processing at a station may have to wait for one or more items for some orders to be delivered to the station from picking and/or from another station before completion of processing of the orders at the station. The picked items of items delivered to a processing station via a conveyance mechanism may be processed at a processing station 55, for example sorted into their respective orders at a sorting station under direction of the control system. Once the processing of items for an order is completed at a station, the items may be delivered to another station for further processing, for example to a sorting station to be sorted into orders, or to a packing station to be packaged for shipping 70.

A materials handling facility may also include one or more receiving 80 operations for receiving shipments 90 of stock from various vendors. The received stock may then be placed into stock storage. The receiving 80 operation may also receive and process returned, purchased, or rented items from customers. The various operations and stations of a materials handling facility may be located in one building or facility, or alternatively may be spread or subdivided across two or more buildings or facilities.

In various embodiments, control system 190 may generate and/or maintain a stored indication of the state of each item within the materials handling facility (e.g., each item might have its own record in a database of the control system). For example, such a stored indication may indicate, for each of one or more of the items within the materials handling facility, the location of the item (e.g., storage bins, induction station, sortation system, order processing station, etc.) and/or the fulfillment process that the item is currently undergoing (e.g., induction, sorting, packing, shipping, etc.).

Figure 3:
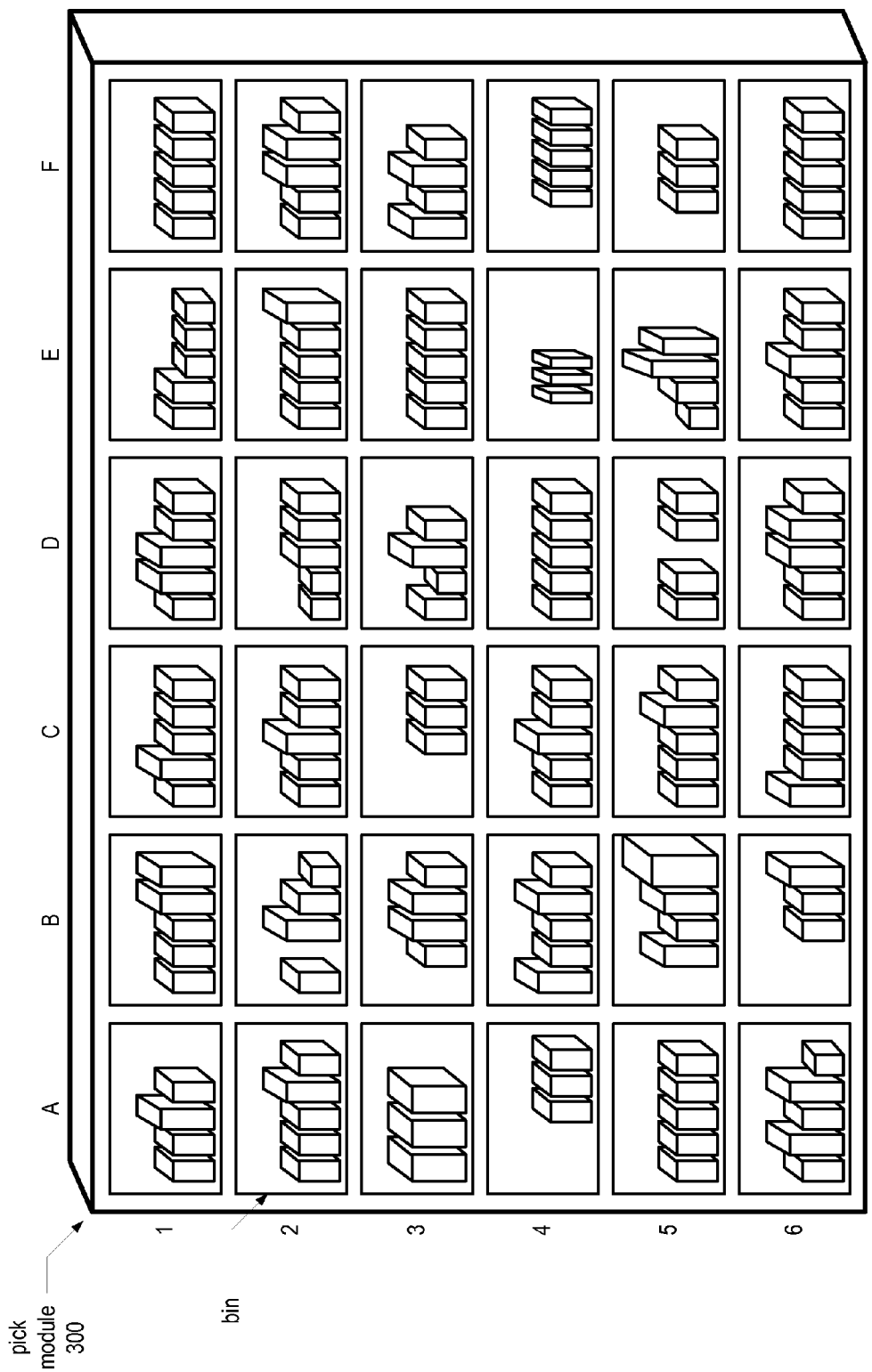
FIG. 3 illustrates a pick module that includes multiple bins configured to store items, according to some embodiments.

FIG. 3 illustrates a pick module according to various embodiments. As described above, multiple pick modules may reside in the materials handling facility. As illustrated, pick module 300 may include multiple bins each configured to store one or more units of items. In various embodiments, units may be stowed in such pick modules subsequent to a receiving process (e.g., receiving 80, described above). In other cases, items may be directed from other processes to the stowing stage. For instance, sorting process 50 may send extra or erroneously picked items back to the stowing stage. Note that the description presented herein refers to bins by column and row number. For instance, pick module 300 includes bins A1, A2, A3, B1, B2, B3 and so on. While pick module 300 includes bins of uniform size, in various other embodiments pick modules may include bins of different sizes. Also note that the illustrated pick module includes various unit of items stowed within ones of the bins. For clarity of illustration, these items have not been individually numbered but nevertheless may be referred to by their bin location (e.g., "the items of bin A1" and so on). The units stored in the pick module may include any of a variety of items, such as food products, books, compact discs, electronics, apparel, or any other item or product. In one embodiment, the units stored in the various pick modules are inventory units used to fulfill orders from an e-commerce portal or website.

Note that in various embodiments, pick modules may be a collection or group of bins and not necessarily a physical structure. Similarly, in some embodiments, bins need not be a physical container and instead may be a designated area. For instance, bins may be designated portions of floor space (e.g., numbered squares on the facility floor) in one embodiment, and storing a unit in such a bin would include placing the unit on a particular portion of the floor space.

Figure 4:
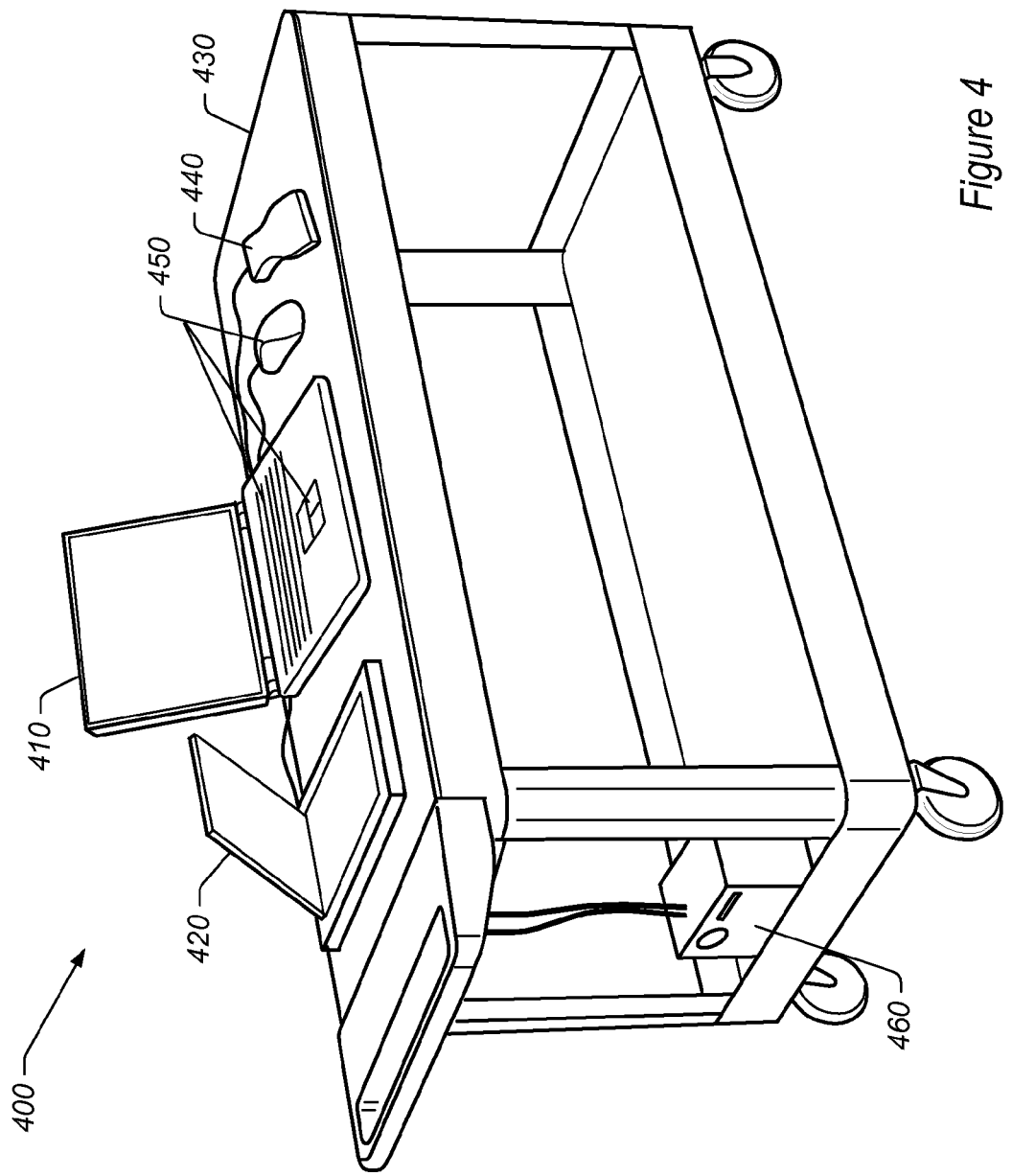
FIG. 4 illustrates a mobile image capture apparatus for capturing images of product labels, according to some embodiments.

FIG. 4 illustrates one embodiment of a mobile image capture apparatus. The mobile image capture apparatus 400 may include a computer system 410 or other device configured to execute an image capture application, as described herein. Computer system 410 may be a machine configured to execute program instructions including but not limited to laptop computers systems, desktop computer system, or personal digital assistants (PDAs). In many cases, computer system 410 also includes or is coupled to a user-interface display, such as a liquid crystal display or other display configured to convey information to a user. The image capture application may be configured to instruct an agent to move the mobile image capture apparatus to a specific location within a materials handling facility for capturing images of various items. For example, such an instruction may be a message presented to the user (e.g., an agent in the materials handling facility) via a user-interface of the image capture application, which may be presented to a user on a display of computer system 410. In other cases, the image capture application may utilize different methods of indicating such instruction to the user, such as through the use of audio. For example, an agent might listen to instructions from the image capture application through an earphone or similar device. Computer system 410 may also include one or more input devices 450, which may include a mouse, a touchpad, a keyboard or some other computer input device. The image capture application described herein may be responsive to input provided via input devices 450.

Other components of the mobile image capture apparatus include cart 430 which may include any mobile structure on which the other components of the mobile image capture apparatus may be supported. In many cases, cart 430 may include one or more wheels or other devices that facilitate the conveyance of cart 430 from one location to another. For instance, an agent may push cart 430 from one bin to another bin in the materials handling facility. The mobile image capture apparatus may also include a portable power supply 460, which may include batteries, fuel cells, or other power source configured to supply power to electronic components, such as items 410, 420 and 440. In many cases, portable power supply 460 may be reusable, such as a rechargeable battery. The mobile image capture apparatus may also include an electronic scanner 440, which may be configured to scan (e.g., determine) identifiers of a bin or of an item. For instance, bins and/or items may be equipped with tags, such as barcodes or radio frequency identifier (RFID) tags. Scanner 440 may be configured to read such tags to determine an identifier of a bin or of an item. Scanner 440 may in various embodiment include an optical scanner and/or radio frequency receivers or transmitters for determining identifiers.

As described above, the instructions generated by the image capture application may instruct an agent to move with the mobile image capture apparatus to a specific location within a materials handling facility for capturing images of various items. One example of such a location includes a particular bin of a pick module. For instance, the image capture application could instruct an agent to travel with the mobile image capture apparatus 400 to bin C3 of pick module 300 described above. Such a bin may include items, such as items stored in inventory. Such items may include any of a variety of items, such as food products, books, compact discs, electronics, apparel, video games, toys, computer software, or any other item or product. In many cases such items may include information pertaining to the item. This information may be specified by various portions of the item including but not limited to a label of the item, packaging of the item, and one or more tags affixed to the item. As described above, such locations specifying information pertaining to the item may be referred to herein as an "item label" or simply a "label." Labels may convey various types of information pertaining to an item including but not limited to nutrition facts, ingredients, directions, indications, warnings, drug interactions and other information pertaining to the item. Examples of various item labels are described below.

Figure 5A:
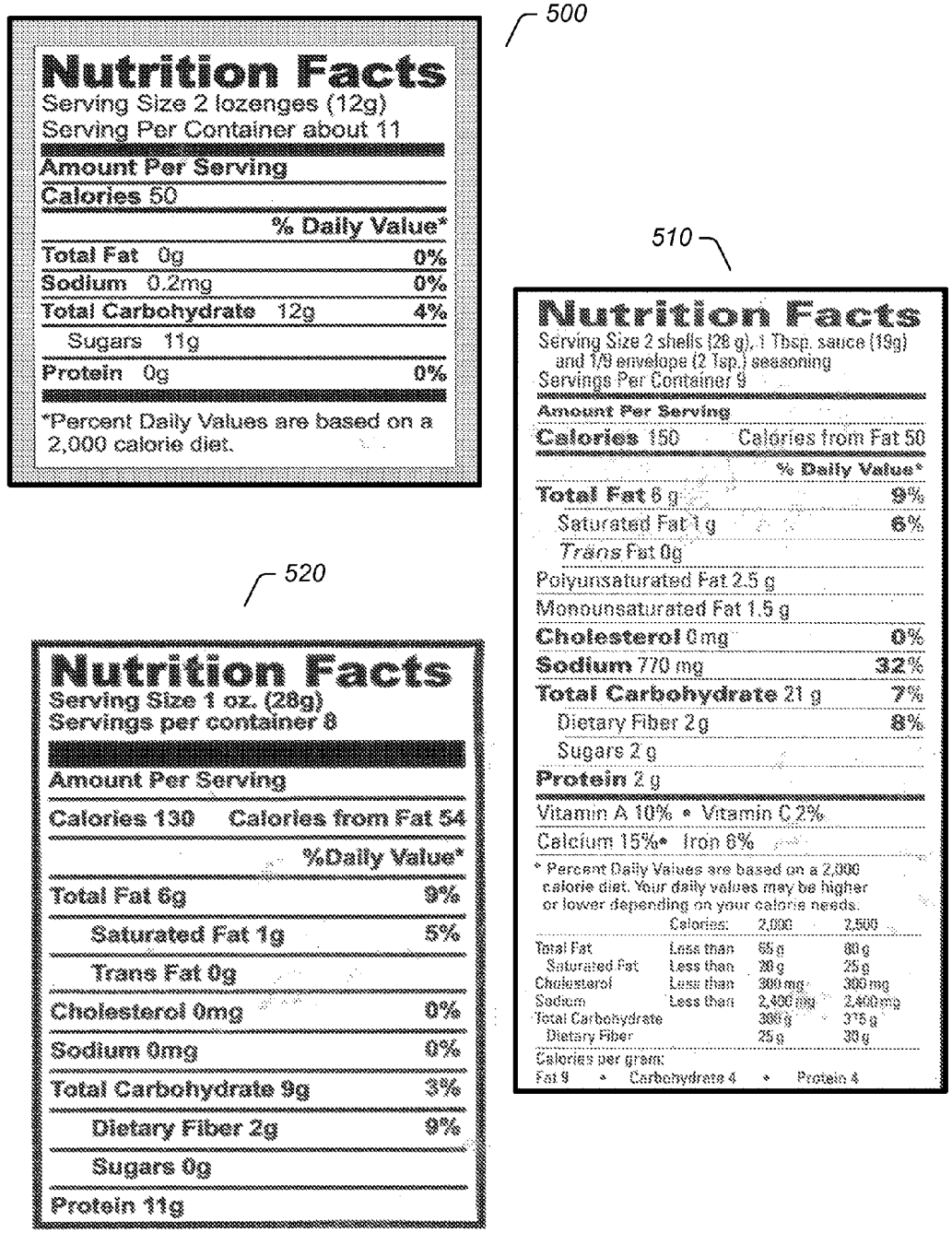
Figure 5C:
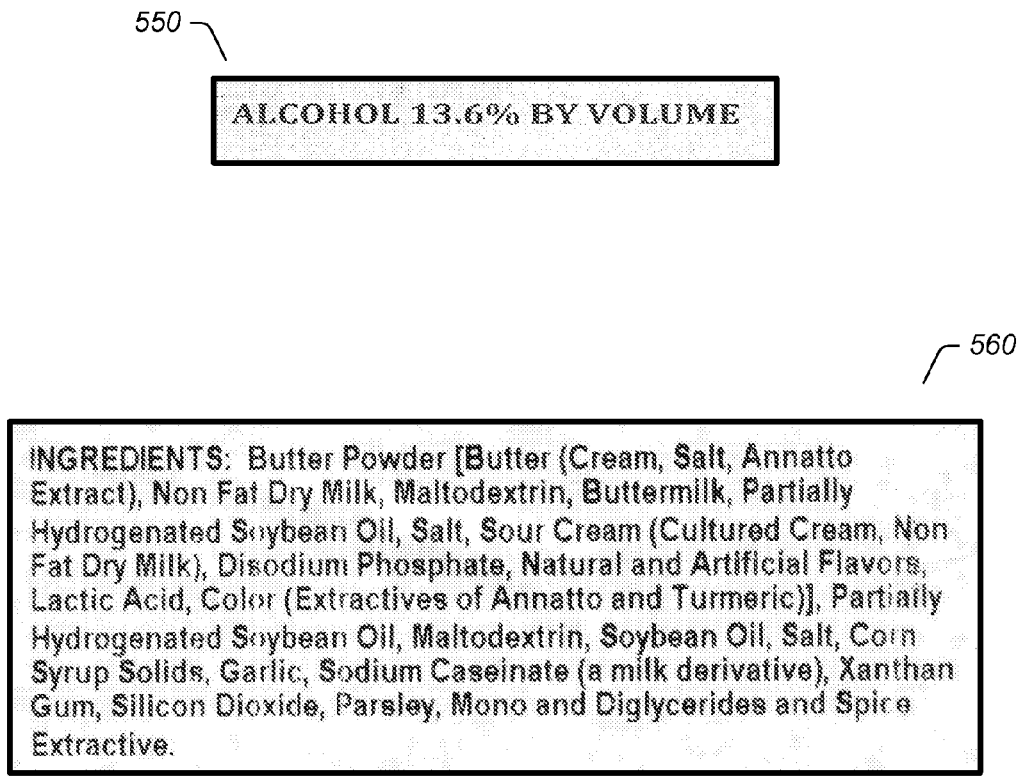

Referring collectively to FIG. 4 and FIGS. 5A-5E, various examples of labels are illustrated. Such labels illustrate examples of the types of labels that may be present on a given item (or item packaging). In some embodiments, a given item may have more than one type of label (e.g., ingredients and warnings). FIG. 5A illustrates three exemplary labels (labels 510, 520 and 530) specifying nutrition facts for respective food products. FIG. 5B illustrates two exemplary labels (labels 540 and 550) specifying descriptions of respective food products. FIG. 5C illustrates two exemplary labels (labels 550 and 560) specifying ingredients for respective food products. FIG. 5D illustrates an exemplary label (label 570) that specifies a warning (e.g., an allergy warning) for a respective food product. FIG. 5E illustrates an exemplary label (label 580) that specifies descriptions for using a respective food product. While the various illustrations of item labels described above largely relate to food products, note that various embodiments are not limited to labels of food products. Indeed, various other item labels may be captured in various embodiments, such as labels of books, compact discs, electronics, apparel, video games, toys, computer software, or any other item or product.

The image capture application may be configured to instruct an agent to utilize an image capture device of the mobile image capture apparatus to capture an image of an item label. One example of an image capture device includes image capture device 420. Note that in various embodiments capturing an image of an item label may but does not need to include capturing an image of an entire label. In some cases, capturing an image of an item label may include capturing only a portion of the item label. Examples of image capture device 420 may include any of various photosensitive apparatuses including but not limited to cameras (digital or analog), image scanners (e.g., a flatbed scanner), and various other types of photosensitive devices, such as devices equipped with CCDs, CISs, photomultipliers, or some variant or substitute thereof. In general, the image capture device may utilize any technology to capture information (e.g., in the form of one or more images) from an item, whether such technologies are presently known or developed in the future. The image capture application may be configured to transmit the captured images to a data extraction component configured to extract information from such images as described in more detail below.

Figure 6:
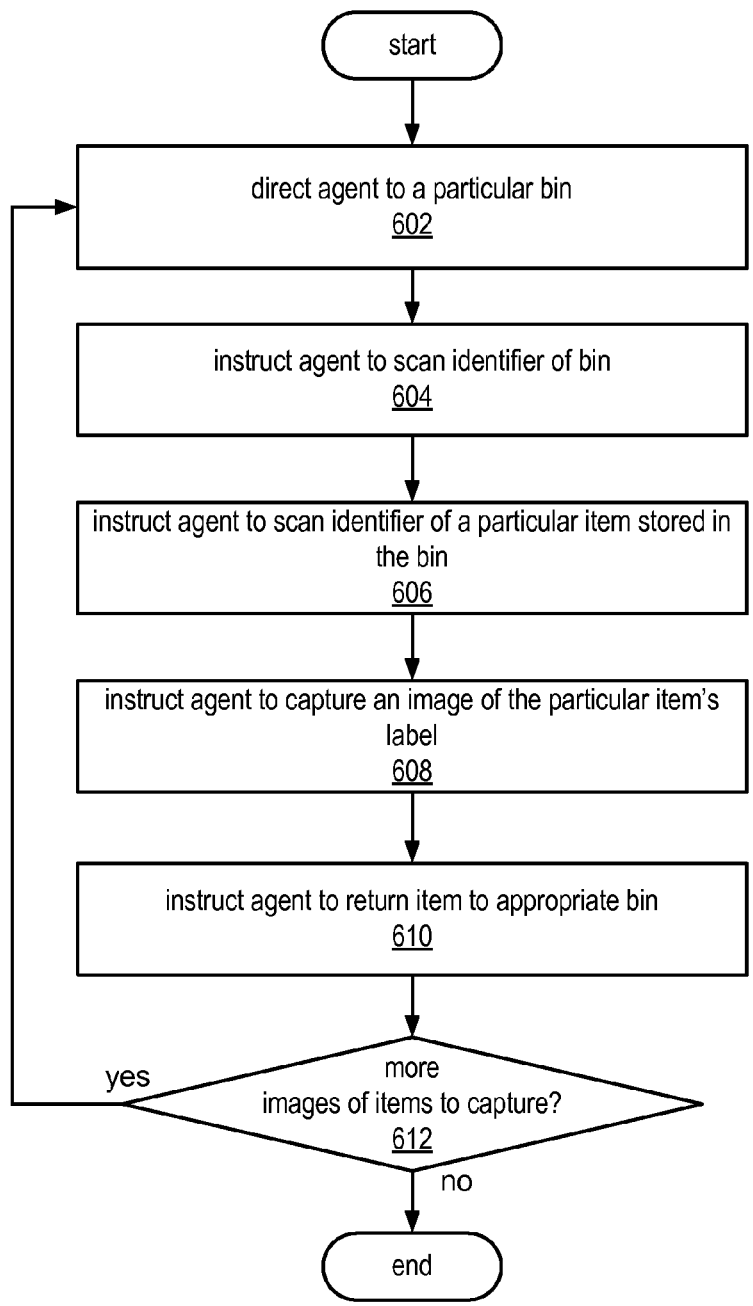
FIG. 6 illustrates a flowchart of an exemplary method for capturing images of various items in a materials handling facility, according to some embodiments.
Figure 7A:
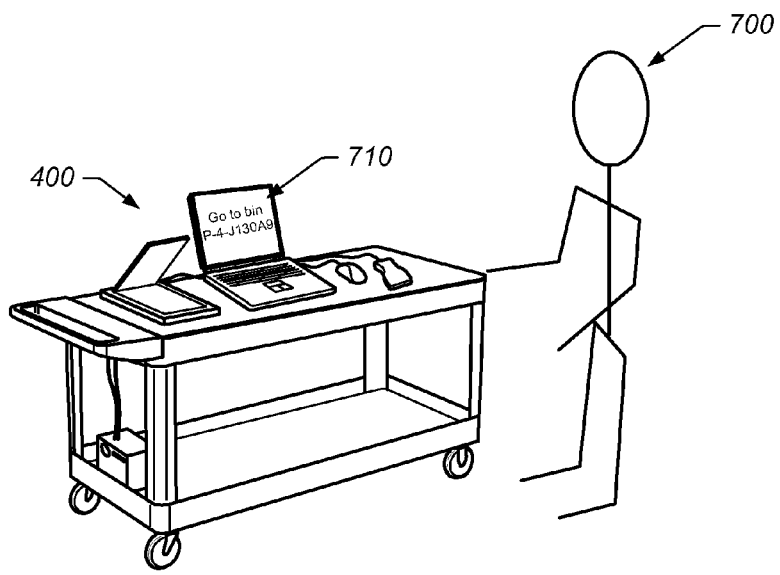
FIGS. 7A-7D illustrate an agent utilizing a mobile image capture apparatus to capture images of various items in a materials handling facility, according to some embodiments.

FIG. 6 illustrates a flowchart of an exemplary method for capturing images of item labels. Note that the following description may also reference FIGS. 7A-D, which illustrate an agent operating a mobile image capture apparatus according to various embodiments. In various embodiments, the method described herein may be performed by the image capture application and/or the mobile image capture apparatus described herein. As illustrated by block 602, the method begins by directing an agent to a particular bin. In various embodiments, directing an agent to a particular bin may include generating a message or instruction on a user-interface, such as generating a message on a display of computer system 410. Such message may specify a particular location that an agent is to travel, such as a particular bin in a materials handling facility. For instance, the illustrated message 710 of FIG. 7A instructs the agent to "Go to bin P-4-J130A9," which may be an identifier of a particular bin.

In various embodiments, block 602 may include determining which bin to direct the agent based on a variety of factors. In one embodiment, the method may include basing such determination at least in part on a previous bin to which the agent was directed according to the illustrated method. For instance, as described in more detail below with respect to block 612, the method described herein may be repeated for multiple items. In various embodiments, determining the particular bin to which an agent is directed may include determining the bin closest to the last bin to which the agent was directed. For instance, since in many cases, an agent may be located at the most recent bin for which the illustrated method has been performed, block 602 may include determining the current bin to which an agent is to be directed based on such most recent bin. In other words, the method may include determining the particular bin to which an agent is directed based on the location of a previous bin visited by the agent. In one example, the agent may be located at a particular bin within the materials handling facility; the method may further include directing the agent to another bin that includes items for which images are to be captured. This other bin may be chosen based on proximity to the particular bin. For example, the method may include choosing the bin closest to the particular bin (with respect to distance or, alternatively, with respect to travel time). In various embodiments, the method may include determining bins to which to direct an agent based on maximizing the number of bins at which an agent is to capture images per distance and/or time traveled within the materials handling facility. For instance, the method may include directing the agent to a quantity of bins concentrated in a relatively small area of the materials handling facility instead of directing the agent to the same quantity of bins spread out in disparate locations within the materials handling facility.

Figure 7B:
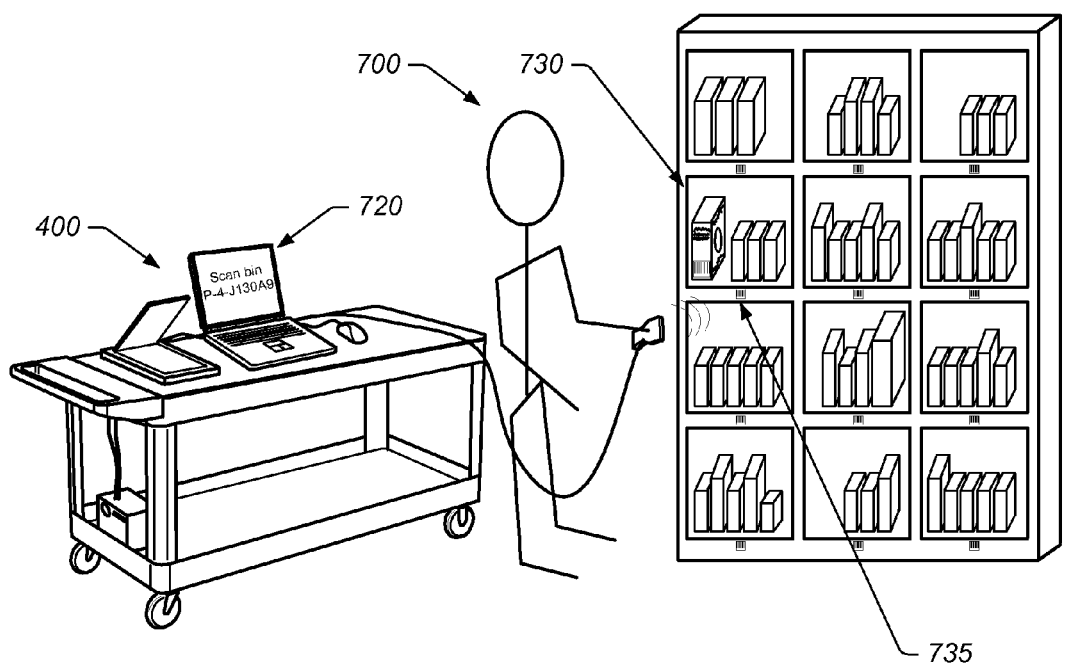

As illustrated by block 604, the method may further include instructing an agent to scan the identifier of the bin. For instance, the method may include generating a message on a display of computer system 410. Such message may specify that the agent is to scan the identifier of the appropriate bin. For example, the illustrated message 720 of FIG. 7B instructs the agent to "Scan bin P-4-J130A9," which may be an identifier of the illustrated bin 730. As is illustrated in FIG. 7B, an agent may use an electronic scanner 440 to scan the identifier of bin 730, which is illustrated as identifier 735 (e.g., a barcode or RFID tag). This portion of the method (e.g., block 604) may also include verifying that the scanned bin is the correct bin (i.e., the bin that the agent was instructed to scan). If the bin is incorrect, the method may include repeating block 604 until the correct bin is scanned.

Figure 7C:
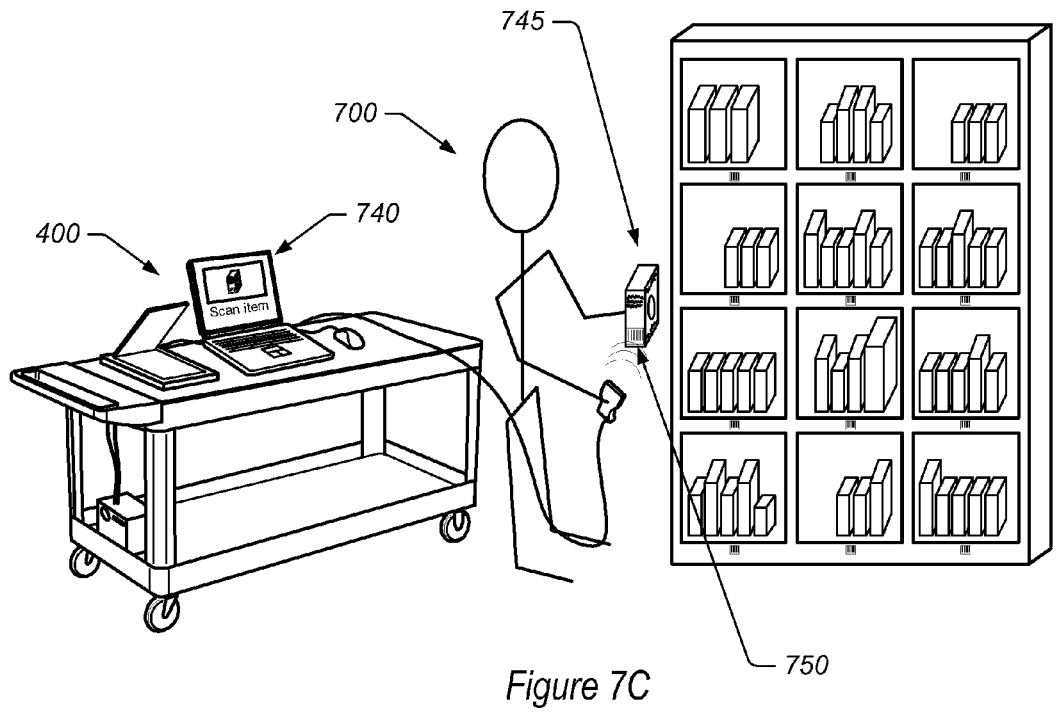

As illustrated by block 606, the method may further include instructing an agent to scan the identifier of a particular item stored in the bin identified in blocks 602-604. For instance, the method may include generating a message on a display of computer system 410. Such message may specify that the agent is to scan the identifier of a particular item. For example, the illustrated message 740 of FIG. 7C instructs the agent to scan the identifier of item 745; such message may include a photograph of the item or some other information (e.g., a universal product code or other identifier) that identifies the item. As illustrated in FIG. 7C, an agent may use an electronic scanner 440 to scan the identifier of item 740, which is illustrated as identifier 750 (e.g., a barcode or RFID tag). This portion of the method (e.g., block 606) may also include verifying that the scanned item is the correct item (i.e., the item that the agent was instructed to scan). If the item is incorrect, the method may include repeating block 606 until the correct item is scanned.

Figure 7D:
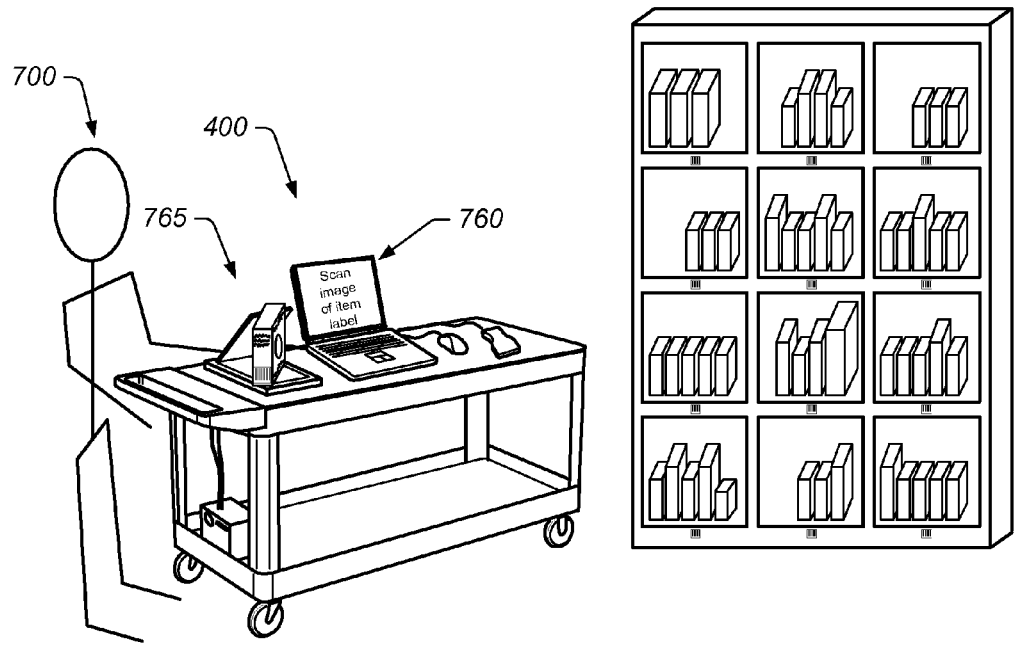

As illustrated by block 608, the method may further include instructing an agent to capture an image of the particular item's label. In some cases, the item may have more than one label and the instruction may specify which label to choose; in other cases such decision may be left up to the agent. In some cases such instruction may specify that an image of the entire label is to be captured; in other cases such instruction may specify that an image of only a portion of the label be captured. In various embodiments, the method may include generating such an instruction by generating a message on a display of computer system 410. Such message may specify that the agent is to capture an image of the item's label. For example, the illustrated message 760 of FIG. 7D instructs the agent to capture an image of the label of item 745. As illustrated in FIG. 7D, the agent may perform a scan process 765, which includes capturing an image of item 745 with image capture device 420. This portion of the method (e.g., block 608) may also include verifying that the image was successfully captured (e.g., verifying that the image was successfully stored in computer system 410 or elsewhere). If the image capture was not successful, the method may include repeating block 608 until the image is successfully captured. In various embodiments, the portion of the method described with respect to block 608 may also be performed for item information other than images. For instance, in some embodiments, the agent may also be instructed to capture item information including but not limited to images or multimedia (video, audio, etc.) of the item and/or its packing, dimensions (e.g., length, width, etc.) of the item and/or its packing, weight of the item and/or its packing, or any other characteristic of the item and/or its packing stored in the bin in inventory.

As illustrated by block 610, the method may in various embodiments also include instructing an agent to return the item back to its appropriate bin. In some cases, this may include instructing the agent to rescan the identifier of the item, rescan the identifier of the bin to which the item is being returned, and verifying that the correct item is returned to the correct bin.

As illustrated by block 612, the method may further include determining whether additional images of other items are to be captured. In various embodiments determining whether additional images of other items are to be captured may in one embodiment include determining whether an agent's work shift has ended or, similarly, whether the agent's work shift is about to end. If it is determined that the agent's shift is about to end, the method may end as indicated by the negative output of block 612. If it additional time is available (e.g., the agent's work shift is not going to end soon), the method may proceed to block 602 where the above described method may be repeated for additional blocks. In other embodiments, the method may include referencing a list of items that are to be scanned and the method may proceed until each item of the list has had an image of their respective label captured according to the method. In other embodiments, the method may include capturing images for all items within a designated area (with the exception of items for which images have already been captured). Such designated area may in some embodiments be a particular portion of the materials handling facility, such one or more particular pick modules or a particular group of bins.

Figure 8A:
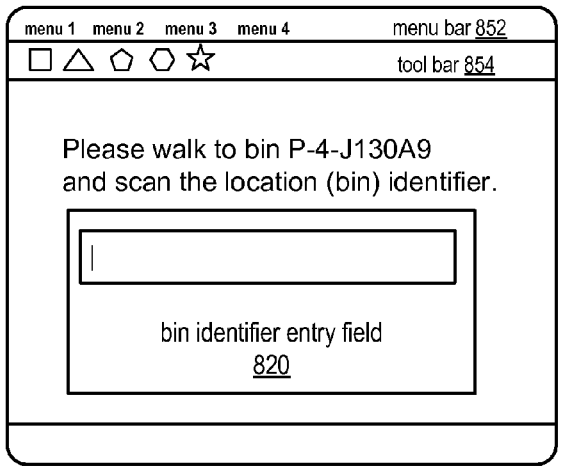
FIGS. 8A-8C illustrate exemplary displays of an image capture application, according to some embodiments.
Figure 8B:
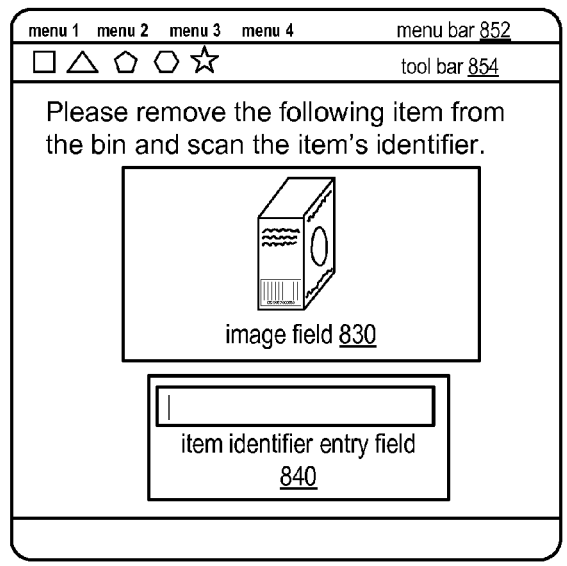
Figure 8C:
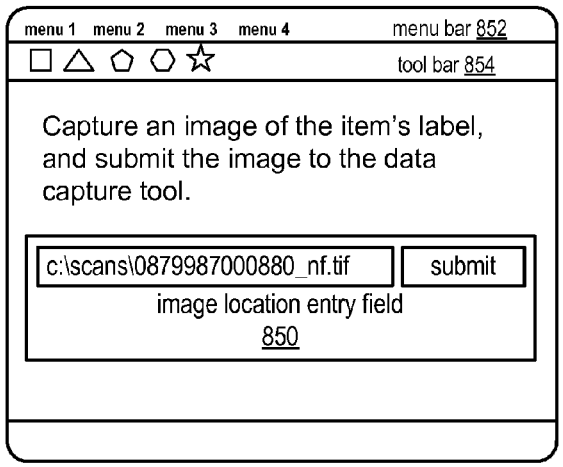

FIGS. 8A-8C illustrate multiple exemplary displays that may be presented to an agent. Each of the exemplary displays may include various controls (e.g., menu bar 852, tool bar 854) for controlling functionality of the image capture application that may execute on computer system 410. For example, FIG. 8A illustrates a display for instructing an agent to travel to a particular bin and scan the bin's identifier, such as described above with respect to blocks 602-604 of the method of FIG. 6. For instance, the agent may scan the bin with electronic scanner 440 and the scanner may (in conjunction with computer system 410) populate bin identifier entry field 820 of the illustrated display. FIG. 8B illustrates an exemplary display for indicating a particular item of the bin to scan (e.g., via image field 830), such as described above with respect to block 606. For example, image field 830 may include an illustration or photograph of the particular item for which an image is to be captured. In various embodiments, the agent may scan the item with electronic scanner 440 and the scanner may (in conjunction with computer system 410) populate bin identifier entry field 840 of the illustrated display. FIG. 8C illustrates an exemplary display for instructing an agent to capture an image of the item's label and submit the image for further processing, such as described above with respect to block 608. For example, image entry field 830 may specify a pathname of an image stored on computer system 410 or elsewhere. In various embodiments, such image may be an image captured via image capture device 420, as described above.

Figure 9:
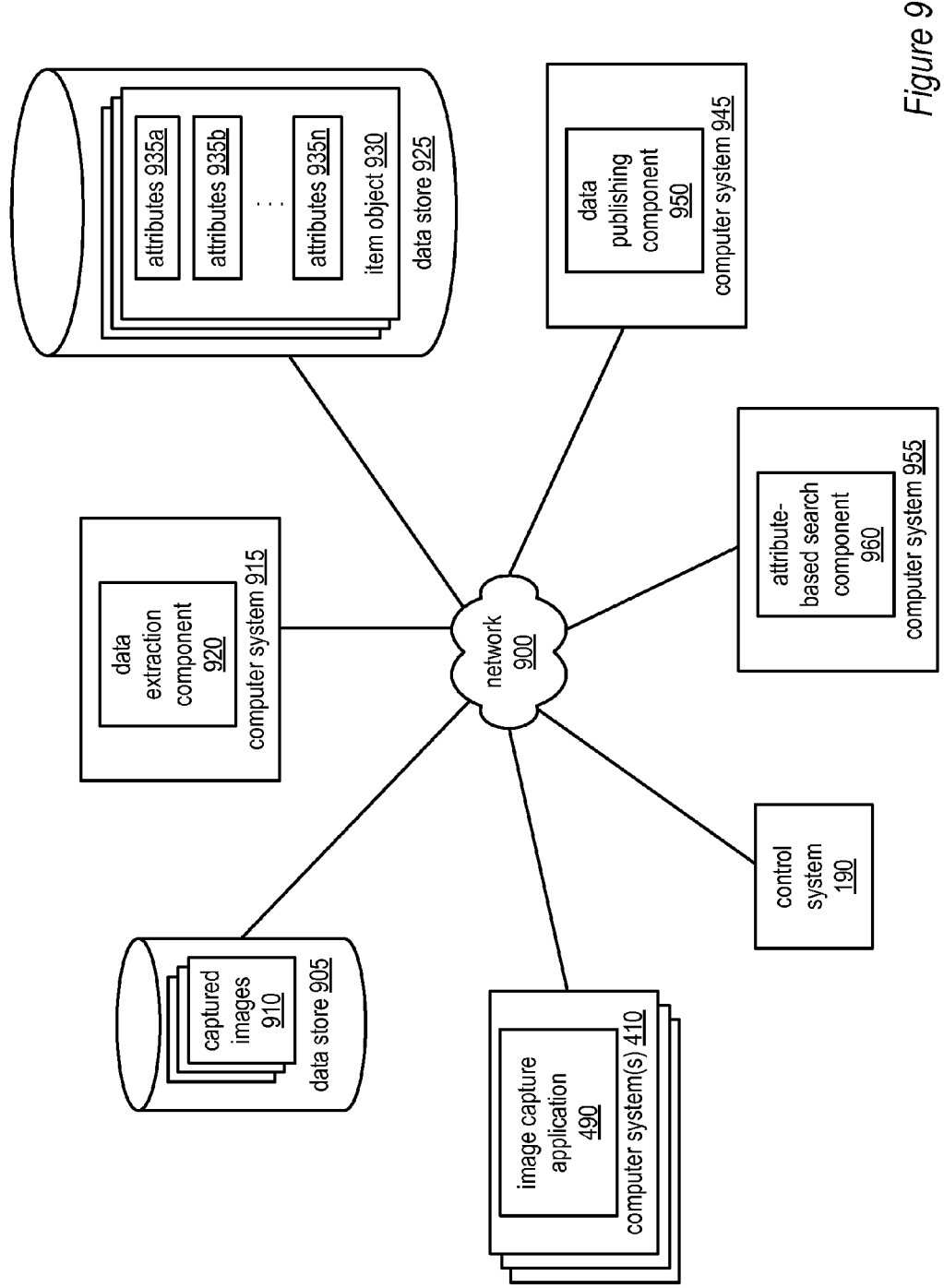
FIG. 9 illustrates an exemplary system configuration including a data extraction component, according to some embodiments.
Figure 10:
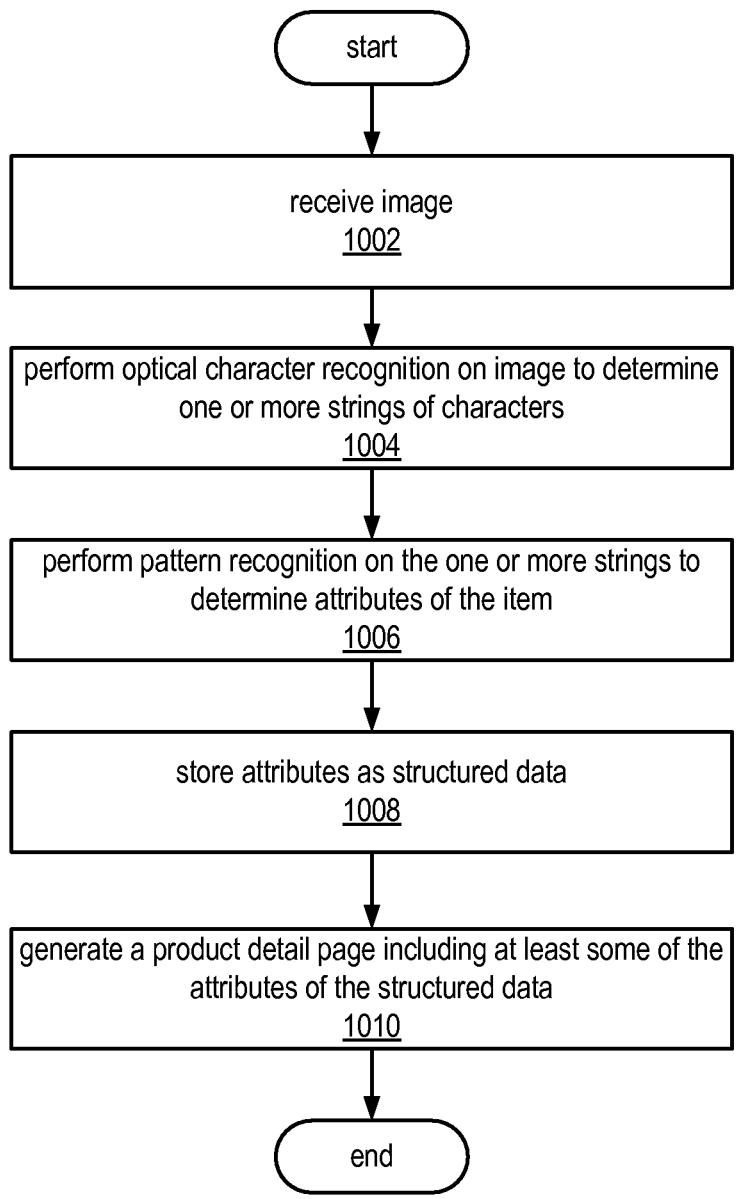
FIG. 10 illustrates a flowchart of an exemplary method for extracting attributes from captured images, according to some embodiments.

FIG. 9 illustrates an exemplary system configuration according to some embodiments. As described above, various embodiments may include capturing images of labels from various items stored in bins of a materials handling facility. For example, one or more agents may operate respective mobile image capture apparatuses throughout the materials handling facility. In various embodiments, each respective computer system 410 may transfer images captured via the above-described mobile image capture apparatus, such as captured images 910, to one or more data stores, such as data store 905. In various embodiments, data store 905 may be configured as a database, as one or more mass storage devices (e.g., physical disks, logical volumes, etc.) configured to store data blocks or files, or in any other suitable configuration for data storage. Captured images may be transferred to such data stores via one or more networks, such as network 900. Network 900 may include a Local Area Network (LAN) (e.g., a corporate or Ethernet network), a Wide Area Network (WAN) (e.g., the Internet), another type of network, or some combination thereof. In various embodiments, the illustrated elements of FIG. 9 may be configured such that any of the illustrated components may write data to or read data from data store 905.

The illustrated control system 190 (described above) may be configured to provide any of the elements illustrated in FIG. 9 with information about the state of the materials handling facility. For example, control system 190 may create, store, and/or maintain a stored representation of bins and the items stored within such bins throughout the materials handling facility. In various embodiments, control system 190 may provide access to such stored representation to one or more of computer systems 410. The illustrated capture application 490 may utilize such representation to determine to which bins an agent is to be directed. For example, in some embodiments, image capture application may direct agents only to bins that contain items for which images have not already been captured.

The illustrated computer system 915 may include a data extraction component 920 (e.g., a software application executable by computer system 915). The data extraction component may be configured to process the images captured by the mobile image capture apparatus 400 described above. Note that data extraction component 920 need not be limited to processing images captured by the mobile image capture apparatus; in various embodiments the data extraction component may be configured to process images from other components or systems. For a given captured image, data extraction component 320 may in various embodiments be configured to perform OCR to determine one or more machine-readable strings of characters from the image. Note that various embodiments are not limited to OCR and that other techniques for extracting machine-readable text from images of printed, type- or hand-written text may be utilized, whether such techniques are presently known or developed in the future.

Data extraction component 920 may be further configured to determine whether one or more patterns (e.g., regular expressions) match one or more of the determined strings of characters. In some cases, a particular set of one or more patterns may be chosen based on a determination of the type of information specified by the image from which the character strings were determined. For instance, if it is determined that such image represents nutrition facts, the data extraction component may be configured to utilize a particular set of patterns designated for the detection of nutrition facts. Similarly, if it is determined that such image represents ingredients, the data extraction component may be configured to utilize a particular set of patterns designated for the detection of ingredients. As described in more detail herein, other types of pattern may be utilized to detect other types of information.

In response to the detection of a particular pattern matching a particular string of characters, data extraction component 920 may extract information from the particular string and store such information as an attribute of the corresponding item. For instance, the data extraction component may extract the value "16" from the particular string and store this as an attribute that represents the quantity of grams of fat per serving of the corresponding item (e.g., a food product). In various embodiments, by virtue of determining that the particular pattern matched the string of characters, data extraction component 920 may be configured to determine that the value "16" is to be stored as an attribute representing the quantity of grams of fat per serving of the corresponding item. More specifically, particular patterns may in various embodiments be associated with particular attributes and thus the data extraction component may leverage such association to store extracted information in a structured format.

In various embodiments, the extracted attributes may be stored as attributes of a particular object, such as an object representing the corresponding item (e.g., the item from which the images were originally captured). In the illustrated example, data extraction component 920 may be configured to generate item objects 930, which each include one or more of the attributes illustrated as attributes 935*a-n*, in data store 925. In various embodiments, data store 925 may be configured as a database, as one or more mass storage devices (e.g., physical disks, logical volumes, etc.) configured to store data blocks or files, or in any other suitable configuration for data storage. In various embodiments, a given object may have one or more associated key-value pairs that each specify an attribute and a value for the attribute. For instance, one attribute might be <fat per serving expressed in grams> and the value for such attribute might be <16> as is the case in the aforementioned example. The data extraction component may in various embodiments compile (i.e., collect or store) the various attributes in one or more databases structured according to a variety of database models including but not limited to the hierarchical database model, network database model, relational database model, object/relational database model, object-oriented database model, the semistructured database model, the associative database model, the EAV database model, the context database model, or another type of database model, whether such model is presently known or developed in the future.

Various embodiments may utilize the structured information (e.g., item attributes, such as nutrition facts, ingredients, directions, warnings, etc.) to provide a content-rich shopping experience for users of a network-based marketplace, such as an e-commerce portal. For instance, the merchant controlling the materials handling facility described herein may in various embodiments sell ones of items stored in the materials handling facility through an e-commerce portal. As described above, such e-commerce portal may be implemented via one or more server computer systems configured to provide product detail pages (e.g., web pages) to client computer systems operated by various customers as well as components for ordering items listed on such product detail pages (e.g., a network-based shopping cart or a similar commerce application). In the illustrated embodiment, computer system 945 may be configured to execute data publishing component 950, which may be configured to publish item attributes captured as described above to corresponding product detail pages (e.g., network based content, such as web pages). For instance, when a customer views a particular product detail page, a listing of captured item attributes may be displayed as part of the product detail page. In other cases, the product detail page may provide a network address (e.g., a hyperlink) to a page that specifies such attributes for the corresponding item. In some embodiments, the data publishing component may respond to requests or queries for data (e.g., a request for one or more attributes of a specific item), which in turn may be utilized to populate content of a corresponding product detail page.

In various embodiments, data extraction component 920 may be configured to provide a network-based interface (e.g., a web services interface or other type of interface accessible via one or more networks). Through the network-based interface, the data extraction component may be configured to provide attributes 935 to other computer systems (in some cases for a fee or other compensation). For instance, in one embodiment, a computer system under the control of another merchant or distributor may request attributes corresponding to particular items; the data extraction component may provide the corresponding attributes to such computer system through the aforementioned network-based interface.

In various embodiments, the illustrated computer system 955 may be configured to execute an attribute-based search component 960, which may be configured to provide attribute-based search functionality to various systems (e.g., a web server providing product detail pages for an e-commerce portal) and/or directly to clients (e.g., a customer of an e-commerce portal). For instance, attribute-based search component 960 may respond to attribute-related queries from client computer systems (i.e., computer systems under the control of customers). More specifically, attribute-based search component 960 may be configured to respond to attribute-based search queries from customers. For example, a customer may submit a search request for all cookies containing less than 100 calories per serving; the attribute-based component may respond to such request by providing a list of one or more items meeting the search criteria. Other examples of a search request that may be serviced by attribute-based search component 960 may include a search for products that do not have child safety warnings or a search request for medication that does note have drowsiness listed as a side effect.

Figure 11A:
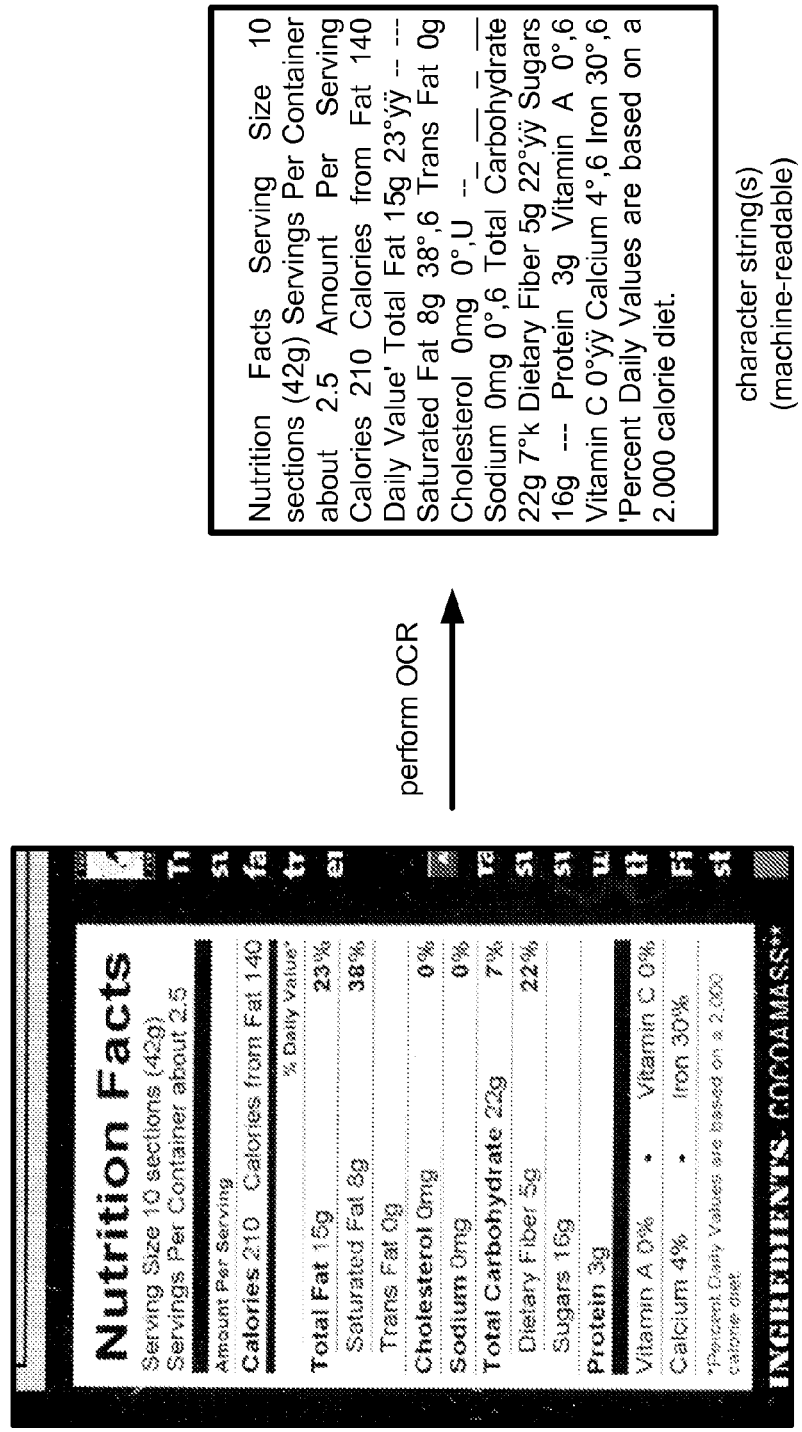

Referring collectively to FIGS. 10 and 11A-C, an exemplary method for extracting attributes from captured images is described. In various embodiments, the illustrated method may be performed by the data extraction component described above. As illustrated by block 1002, the method may be performed on one or more received images. For example, FIG. 11A illustrates one example of a captured image. In this particular example, the image illustrates nutrition facts of a food product label. However, in various other cases, other types of labels (e.g., labels indicating ingredients, directions, indications, warnings, drug interactions) may be evaluated. In various embodiments, receiving captured images may include accessing one or more images from a data store, such as the captured images 910 of FIG. 9. As illustrated by block 1004, the method may further include performing OCR on the received image to determine one or more strings of characters. Note that various embodiments are not limited to OCR and that other techniques for extracting machine-readable text from images of printed, type- or hand-written text may be utilized, whether such techniques are presently known or developed in the future. As illustrated by FIGS. 11A-B, performing OCR on the image may result in one or more character strings of machine-readable text. In some embodiments, additional operations (e.g., contrast adjustment, brightness adjustment, file type conversion) may be performed prior to the OCR process.

As illustrated by block 1006, the method may further include performing pattern recognition on the one or more character strings to determine attributes of the item from which the image was captured. In various embodiments, performing pattern recognition may include determining whether one or more patterns (e.g., regular expressions) match one or more of the determined strings of characters. In some cases, a particular set of one or more patterns may be chosen based on a determination of the type of information specified by the image from which the character strings were determined. For instance, if it is determined that such image represents nutrition facts, the method may include utilizing a particular set of patterns designated for the detection of nutrition facts. Similarly, if it is determined that such image represents ingredients, the method may include utilizing a particular set of patterns designated for the detection of ingredients. Other types of patterns (e.g., patterns tailored for determining attributes relating to directions, indications, warnings, drug interactions, or other product information) may be utilized. In various embodiments, such patterns may be "regular expressions," which may sometimes be referred to as a "RegEx" or "regexp." In various embodiments, the specific syntax of regular expressions may depend on various factors including the particular implementation, programming language, or programming library being utilized. Below, various examples of regular expressions are illustrated. However, it should be understood that such examples are merely exemplary and that in other embodiments, other types of regular expressions may be utilized.

In response to the detection of a particular pattern matching a particular string of characters, the method may include extracting information from the particular string and storing such information as an attribute of the corresponding item. More specifically, particular patterns may in various embodiments be associated with particular attributes and thus the data extraction component may leverage such association to store extracted information in a structured format. For example, the method may include evaluating the one or more characters strings with the following regular expression to determine a generic, unknown nutrient of food product:

/(([A-Za-z.]*\.?     ?){1,5})([\t]*([\dOoiIlhB.<     >]*  (g\mg\cal\kcal\kg))?([\t]*(\(?[\t]*[\dOoiIlhB.<     >]+?  [%\302\260][^,.:\s]{0,3} ?D?V? ?\)?)+)[\s,:.\n]/

In another example, the method may include evaluating the one or more characters strings with the following regular expression to determine a known nutrient:

/((?i)[NUTRIENT_OR_SYNONYM_NAME]:?)\s*  ((less\s?than\more\s?than\<|>)     ?\s?(\w|\.)+\s?  (g|mg|kg|cal|kcal){1})?((\s*(\w+\s?[\%\\302\260]))*)/

In an additional example, a particular regular expression may be utilized to determine a particular attribute or such attribute's synonyms. For example, one attribute might be "total fat" whereas the same attribute might also be denoted by "tot. fat" or some other synonym for the attribute. The method may include evaluating the one or more characters strings with the following regular expression to determine a quantity of servings per container (or a synonym for servings per container):

/((?i)[NUTRENT_OR_SYNONYM_NAME]:*)\s*(((?i)  about)?\s?\d{1,3})/

In some cases, one or more attributes may have more than one value. This may be referred to as a "variation." Variations may occur, e.g., when a food product obtains two sets of nutritional information due to different states in which the food product may be consumed. For instance, cereal may be consumed on its own or with another food product, such as milk. Accordingly, some product labels may specify two distinct values of an attribute for the same product. For instance, calcium content in cereal may differ depending on whether the cereal is consumed with or without milk. The method may include evaluating the one or more character strings with the following regular expression to determine the presence of variations:

/((?i))a....t\s?(per|\/)\s).......).*((?i)(as|with|having)\s.*)/

In various cases, when a string of characters meets the requirements of a particular pattern, the pattern is said to match the particular string. Since a given pattern may correspond to a particular attribute, the method may include extracting a value for the particular attribute from a string in the event that the particular pattern matches the string. For instance, the method may include extracting the value "16" from the particular string and storing this as an attribute that represents the quantity of grams of fat per serving of the corresponding item (e.g., a food product). In various embodiments, by virtue of determining that the particular pattern matched the string of characters, the method may include determining that the value "16" is to be stored as an attribute representing the quantity of grams of fat per serving of the corresponding item.

As illustrated by block 1008, the method may further include storing the determined attributes (and/or their respective values) as structured data. One representation of such structured information is illustrated by FIG. 11B, which represents a listing of attributes (e.g., the nutrient information calories) and respective values for such attributes (e.g., 210 calories). In various embodiments, the method may include storing the extracted attributes as attributes of a particular object, such as an object (e.g., item object 930, described above) representing the corresponding item (e.g., the item from which the images were originally captured). For example, a given object may have one or more associated key-value pairs that each specify an attribute and a value for the attribute. For instance, one attribute might be <fat per serving expressed in grams> and the value for such attribute might be <16> as is the case in the aforementioned example.

The method may include compiling (i.e., collecting or storing) the various attributes in one or more databases structured according to a variety of database models including but not limited to the hierarchical database model, network database model, relational database model, object/relational database model, object-oriented database model, the semistructured database model, the associative database model, the EAV database model, the context database model, or another type of database model, whether such model is presently known or developed in the future.

As illustrated by block 1010, the method may further include generating a product detail page including at least some of the attributes of the structured data. For instance, various embodiments may utilize the structured information (e.g., item attributes, such as nutrition facts, ingredients, directions, warnings, etc.) to provide a content-rich shopping experience for users of an network-based marketplace, such as an e-commerce portal. For instance, the merchant controlling the materials handling facility described herein may in various embodiments sell ones of items stored in the materials handling facility through an e-commerce portal. Such e-commerce portal may be implemented via one or more server computer systems configured to provide product detail pages (e.g., web pages) to client computer systems operated by various customers as well as components for ordering items listed on such product detail pages (e.g., a network-based shopping cart or a similar commerce application). Accordingly, the method described herein may include generating one or more of such product detail pages including at least some of the determined attributes. In various embodiments, the method may include publishing item attributes captured as described above to corresponding product listing pages (e.g., network based content, such as web pages). For instance, when a customer views a particular product detail page, a listing of captured item attributes may be displayed as part of the product detail page. In other cases, the product detail page may provide a network address (e.g., a hyperlink) to a page that specifies such attributes for the corresponding item. In some embodiments, the method may include responding to requests or queries for data (e.g., a request for one or more attributes of a specific item), which in turn may be utilized to populate content of a corresponding product detail page. One example of attributes that may be included as part of product detail pages is illustrated by FIG. 11C. For instance, in one embodiment, the attributes stored as structured information may be used to populate a template on a product detail page.

In various other embodiments, the method may further include providing attribute-based search functionality to various systems (e.g., a web server providing product detail pages for an e-commerce portal) and/or directly to clients (e.g., customer of an e-commerce portal). For instance, the method may include responding to attribute-related queries from client computer systems (i.e., computer systems under the control of customers). For example, a customer may submit a search request for all cookies containing less than 100 calories per serving; the method may include responding to such request by providing a list of one or more items meeting the search criteria. Other examples of a search request that may be serviced by the attribute-based search component may include a search for products that do not have child safety warnings or a search request for medication that does note have drowsiness listed as a side effect.

In various embodiments, the attributes extracted from captured images may undergo a quality assurance process to ensure the accuracy of the extracted attributes. For example, the method may include receiving a captured image and an attribute extracted from that image. If the attribute and the image match, the attribute may be approved, such as approved for inclusion in a product detail page. For instance, if an image indicates that a product contains 16 grams of total fat and the corresponding attribute also indicates that the product contains 16 grams of total fat, the attribute may be approved. If the attribute and the image do not match, the attribute may be corrected to reflect the correct information or the attribute may be sidelined for further quality assurance review. For instance, if an image indicates that a product contains 16 grams of total fat and the corresponding attribute indicates that the product contains 18 grams of total fat, the attribute may be correct or sidelined for further review.

Figure 12:
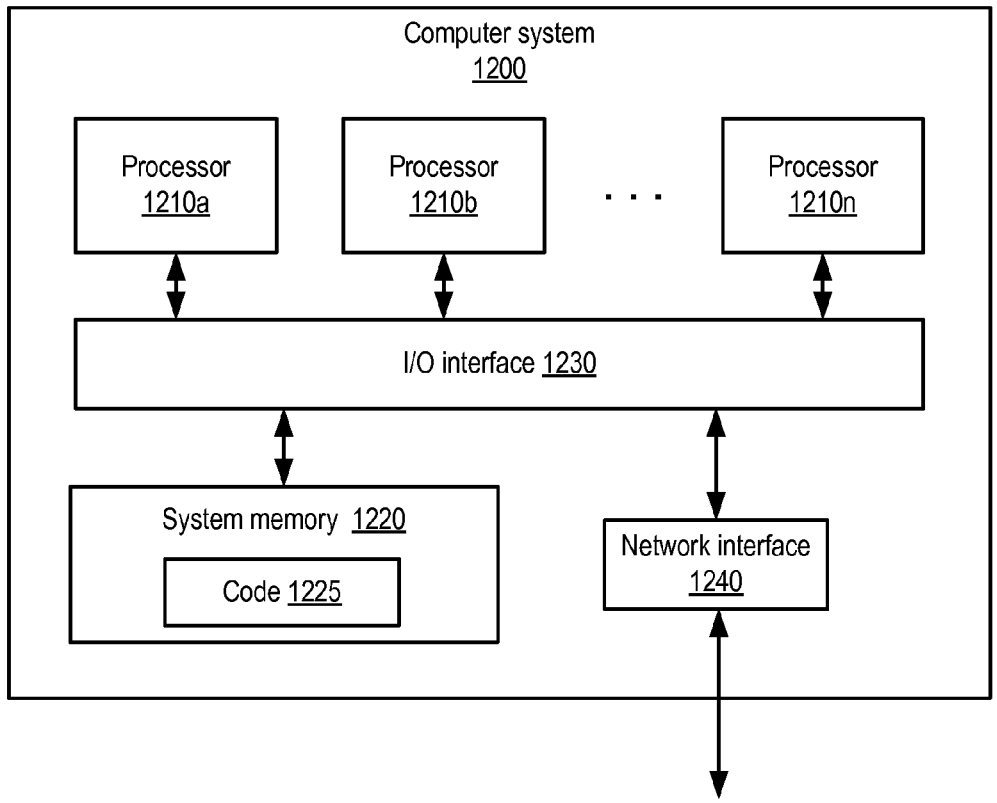
FIG. 12 is a block diagram illustrating an exemplary embodiment of a computer system, according to some embodiments.

In various embodiments, a system that implements one or more components of a method and system for capturing and utilizing item attributes as described herein may include a general-purpose computer system that includes or is configured to access one or more computer-accessible media, such as computer system 1200 illustrated in FIG. 12. Such computer system may in various embodiments implement any of the various components illustrated in FIG. 9. In the illustrated embodiment, computer system 1200 includes one or more processors 1210 coupled to a system memory 1220 via an input/output (I/O) interface 1230. Computer system 1200 further includes a network interface 1240 coupled to I/O interface 1230.

In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

System memory 1220 may be configured to store instructions and data accessible by processor(s) 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for a control system 1120 and/or reader 1126 of a method and system for capturing and utilizing item attributes, are shown stored within system memory 1220 as code 1225.

In one embodiment, I/O interface 1230 may be configured to coordinate I/O traffic between processor 1210, system memory 1220, and any peripheral devices in the device, including network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices attached to a network 900, such as other computer systems, communications devices, control mechanisms, readers, scanners and so on that are components of the method and system for capturing and utilizing item attributes. The communications channels may include, but are not limited to conventional and mobile telephone and text messaging communications channels. Network interface 1240 may commonly support one or more wireless networking protocols (e.g., Wi-Fi/IEEE 802.11, or another wireless networking standard). However, in various embodiments, network interface 1240 may support communication via any suitable wired or wireless general data networks, such as other types of Ethernet networks, for example. Additionally, network interface 1240 may support communication via telecommunications/telephony networks such as analog voice networks or digital fiber communications networks, via storage area networks such as Fibre Channel SANs, or via any other suitable type of network and/or protocol.

In some embodiments, system memory 1220 may be one embodiment of a computer-accessible medium configured to store program instructions and data as described above for implementing various components of a method and system for capturing and utilizing item attributes, such as the elements illustrated in FIG. 9. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 1200 via I/O interface 1230. A computer-accessible medium may also include any volatile or non-volatile media such as RAM (e.g. SDRAM, DDR SDRAM, RDRAM, SRAM, etc.), ROM, etc, that may be included in some embodiments of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. A computer-accessible medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of methods may be changed, and various elements may be added, reordered, combined, omitted, modified, etc.

Various modifications and changes may be made as would be obvious to a person skilled in the art having the benefit of this disclosure. It is intended that embodiments embrace all such modifications and changes and, accordingly, the above description to be regarded in an illustrative rather than a restrictive sense.

What is claimed is:

1. A computer-implemented method, comprising:
   receiving an image of a label of an item;
   performing optical character recognition on said received image such that one or more strings of characters are determined from said received image;
   determining a particular type of information indicated by said received image from among a plurality of different types of information, wherein a different respective set of one or more patterns of characters is designated for each different one of the plurality of different types of information;
   based at least in part on said particular type of information, selecting a particular set of one or more patterns of characters designated for said particular type of information indicated by said received image, wherein a particular pattern of the one or more patterns of characters of said particular set is a pattern for locating a value for an attribute in the one or more strings of characters determined from said received image, wherein the value is not currently provided in structured data for the item;
   determining that said particular pattern of characters of said particular set matches a particular string of said one or more strings of characters determined from said received image, wherein the particular pattern of characters indicates the attribute of the item whose value is not currently provided in the structured data for the item;
   extracting information from said particular string as the value for the attribute of said item;
   storing the value for the attribute from said extracting in the structured data for the item; and
   in response to a request subsequent to said storing, generating at least part of a network-based page associated with said item, wherein said generating comprises populating said network-based page with information from the structured data for the item, the information from the structured data including the value that was obtained from said extracting information from said particular string determined from said received image.

2. The method of claim 1, wherein said particular type of information includes one of: nutrition facts for said item, warnings associated with said item, ingredients contained within said item, directions for using said item, drug interactions associated with said item.

3. The method of claim 1, wherein said particular pattern comprises a regular expression, wherein determining that the particular pattern matches the particular string comprises determining that the particular string meets one or more requirements specified by the regular expression.

4. The method of claim 1, further comprising receiving a search query for items having a particular attribute, and responding to said query by generating an indication of one or more items having said particular attribute.

5. The method of claim 1, further comprising providing said one or more attribute values to one or more computer systems via a network-based service interface.

6. A system, comprising:
   one or more processors;
   a memory coupled to the one or more processors, wherein said memory stores program instructions executable by the one or more processors to implement a data extraction component configured to:
      receive an image of a label of an item;
      perform optical character recognition on said received image such that one or more strings of characters are determined from said received image;
      determine a particular type of information indicated by said received image from among a plurality of different types of information, wherein a different respective set of one or more patterns of characters is designated for each different one of the plurality of different types of information;
      based at least in part on said particular type of information, select a particular set of one or more patterns of characters designated for said particular type of information indicated by said received image, wherein a particular pattern of the one or more patterns of characters of said particular set is a pattern for locating a value for an attribute in the one or more strings of characters determined from said received image, wherein the value is not currently provided in structured data for the item;
      determine that said particular pattern of characters of said particular set matches a particular string of said one or more strings of characters determined from said received image, wherein the particular pattern of characters indicates the attribute of the item whose value is not currently provided in the structured data for the item;
      extract information from said particular string as the value for the attribute of said item; and
      store the value for the attribute from said extraction in the structured data for the item; and
      in response to a request subsequent to said store, generate at least part of a network-based page associated with said item, wherein said generation comprises populating said network-based page with information from the structured data for the item including the value that was obtained from said extraction from said particular string determined from said received image.

7. The system of claim 6, wherein said particular type of information includes one of: nutrition facts for said item, warnings associated with said item, ingredients contained within said item, directions for using said item, drug interactions associated with said item.

8. The system of claim 6, wherein said particular pattern comprises a regular expression, wherein to determine that the particular pattern matches the particular string the data extraction component is configured to determine that the particular string meets one or more requirements specified by the regular expression.

9. The system of claim 6, wherein the data extraction component is configured to receive a search query for items having a particular attribute, and respond to said query by generating an indication of one or more items having said particular attribute.

10. The system of claim 6, wherein the data extraction component is configured to provide said one or more attribute values to one or more computer systems via a network-based service interface.

11. A non-transitory computer-readable storage medium storing program instructions computer-executable to implement a data extraction component configured to:
   receive an image of a label of an item;
   perform optical character recognition on said received image such that one or more strings of characters are determined from said received image;
   determine a particular type of information indicated by said received image from among a plurality of different types of information, wherein a different respective set of one or more patterns of characters is designated for each different one of the plurality of different types of information;

based at least in part on said particular type of information, select a particular set of one or more patterns of characters designated for said particular type of information indicated by said received image, wherein a particular pattern of the one or more patterns of characters of said particular set is a pattern for locating a value for an attribute in the one or more strings of characters determined from said received image, wherein the value is not currently provided in structured data for the item;

determine that said particular pattern of characters of said particular set matches a particular string of said one or more strings of characters determined from said received image, wherein the particular pattern of characters indicates the attribute of the item whose value is not currently provided in the structured data for the item;

extract information from said particular string as the value for the attribute of said item;

store the value for the attribute from said extraction in the structured data for the item;

in response to a request subsequent to said store, generate at least part of a network-based page associated with said item, wherein said generation comprises populating said network-based page with information from the structured data for the item including the value that was obtained from said extraction from said particular string determined from said received image.

12. The medium of claim 11, wherein said particular type of information includes one of: nutrition facts for said item, warnings associated with said item, ingredients contained within said item, directions for using said item, drug interactions associated with said item.

13. The medium of claim 11, wherein said particular pattern comprises a regular expression, wherein to determine that the particular pattern matches the particular string the data extraction component is configured to determine that the particular string meets one or more requirements specified by the regular expression.

14. The medium of claim 11, wherein the data extraction component is configured to receive a search query for items having a particular attribute, and respond to said query by generating an indication of one or more items having said particular attribute.

15. The medium of claim 11, wherein the data extraction component is configured to provide said one or more attribute values to one or more computer systems via a network-based service interface.

16. The method of claim 1, wherein said stored values for the item that were obtained from said extracting have one or more associated key-value pairs that each specify the attribute and a value for the attribute.

17. The system of claim 6, wherein to store the one or more values for the attribute as structured data for the item the data extraction component is further configured to store the one or more values for the attribute that were obtained from said extracting as one or more associated key-value pairs that each specify the attribute and a value for the attribute.

18. The medium of claim 11, wherein the one or more values for the attribute that were obtained from said extracting have one or more associated key-value pairs that each specify the attribute and a value for the attribute.

* * * * *